United States Patent
England et al.

(10) Patent No.: US 6,330,670 B1
(45) Date of Patent: Dec. 11, 2001

(54) DIGITAL RIGHTS MANAGEMENT OPERATING SYSTEM

(75) Inventors: Paul England, Bellevue; John D. DeTreville, Seattle, both of WA (US); Butler W. Lampson, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/227,561

(22) Filed: Jan. 8, 1999

Related U.S. Application Data

(60) Provisional application No. 60/105,891, filed on Oct. 26, 1998.

(51) Int. Cl.[7] .................................................. G06F 9/44
(52) U.S. Cl. ................................. 713/2; 713/200; 717/11
(58) Field of Search ................................... 713/1, 2, 155, 713/164–167, 200; 717/11

(56) References Cited

U.S. PATENT DOCUMENTS

| | | |
|---|---|---|
| 4,827,508 | 5/1989 | Shear . |
| 4,969,189 | 11/1990 | Ohta et al. . |
| 4,977,594 | 12/1990 | Shear . |
| 5,050,213 | 9/1991 | Shear . |
| 5,140,634 | 8/1992 | Guillou et al. . |
| 5,276,311 | 1/1994 | Hennige . |
| 5,410,598 | 4/1995 | Shear . |
| 5,473,690 | 12/1995 | Grimonprez et al. . |
| 5,473,692 | 12/1995 | Davis . |
| 5,544,246 | 8/1996 | Mandelbaum et al. . |
| 5,654,746 | 8/1997 | McMullan, Jr. et al. . |
| 5,721,781 * | 2/1998 | Deo et al. ............................. 380/25 |
| 5,796,824 | 8/1998 | Hasebe et al. . |
| 5,812,662 | 9/1998 | Hsu et al. . |
| 5,812,980 | 9/1998 | Asai . |
| 5,892,900 | 4/1999 | Ginter . |
| 5,910,987 | 6/1999 | Ginter et al. . |
| 5,915,019 | 6/1999 | Ginter et al. . |
| 5,917,912 | 6/1999 | Ginter et al. . |
| 5,920,861 | 7/1999 | Hall et al. . |
| 5,933,498 | 8/1999 | Schneck et al. . |
| 5,940,504 | 8/1999 | Griswold . |
| 5,943,422 | 8/1999 | Van Wie et al. . |
| 5,949,876 | 9/1999 | Ginter et al. . |
| 5,953,502 | 9/1999 | Helbig, Sr. . |
| 5,982,891 | 11/1999 | Ginter et al. . |
| 5,991,876 | 11/1999 | Johnson et al. . |
| 6,006,332 | 12/1999 | Rabne et al. . |

(List continued on next page.)

*Primary Examiner*—Thomas M. Heckler
(74) *Attorney, Agent, or Firm*—Lee & Hayes, PLLC

(57) ABSTRACT

A digital rights management operating system protects rights-managed data, such as downloaded content, from access by untrusted programs while the data is loaded into memory or on a page file as a result of the execution of a trusted application that accesses the memory. To protect the rights-managed data resident in memory, the digital rights management operating system refuses to load an untrusted program into memory while the trusted application is executing or removes the data from memory before loading the untrusted program. If the untrusted program executes at the operating system level, such as a debugger, the digital rights management operating system renounces a trusted identity created for it by the computer processor when the computer was booted. To protect the rights-managed data on the page file, the digital rights management operating system prohibits raw access to the page file, or erases the data from the page file before allowing such access. Alternatively, the digital rights management operating system can encrypt the rights-managed data prior to writing it to the page file. The digital rights management operating system also limits the functions the user can perform on the rights-managed data and the trusted application, and can provide a trusted clock used in place of the standard computer clock.

24 Claims, 10 Drawing Sheets

U.S. PATENT DOCUMENTS

| | | |
|---|---|---|
| 6,009,274 | 12/1999 | Fletcher et al. . |
| 6,009,401 | 12/1999 | Horstmann . |
| 6,073,124 | 6/2000 | Krishnan et al. . |
| 6,112,181 | 8/2000 | Shear et al. . |
| 6,138,119 | 10/2000 | Hall et al. . |
| 6,148,402 * | 11/2000 | Campbell .......................... 713/200 |
| 6,157,721 | 12/2000 | Shear et al. . |
| 6,185,683 | 2/2001 | Ginter et al. . |

* cited by examiner

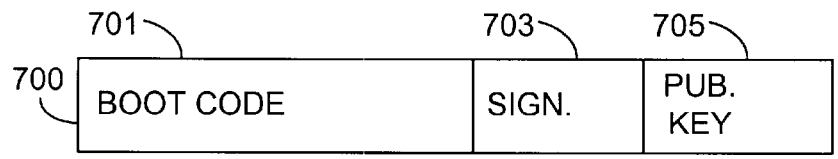
*Fig. 7A*
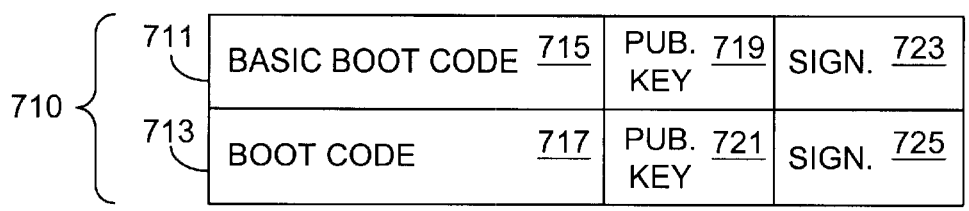
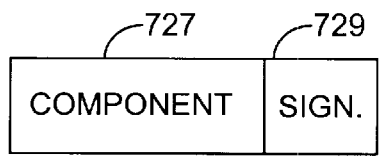
*Fig. 7B*
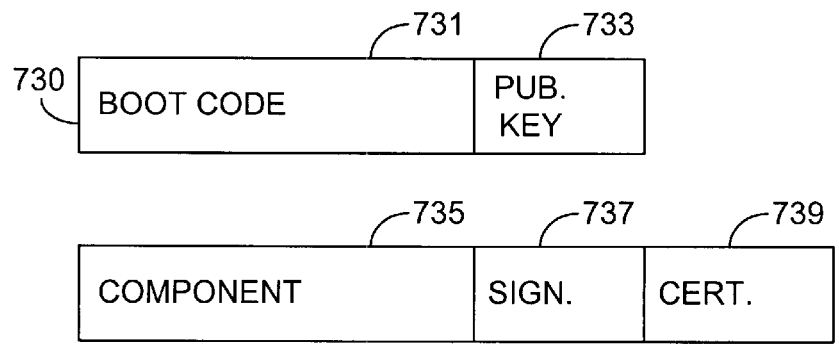
*Fig. 7C*

1000 ─→

| 1001 | BASIC TRUST LEVEL ID |
| 1003 | EXTENDED TRUST LEVEL ID1 |
| 1003 | EXTENDED TRUST LEVEL ID2 |
| | ⋮ |

| 1101 | USAGE COUNTER |
| 1103 | DERIVATION RIGHTS |
| 1105 | EXPIRATION COUNTER |
| 1107 | SUBLICENSE RIGHTS |
| | ⋮ |

Fig. 11

DIGITAL RIGHTS MANAGEMENT OPERATING SYSTEM

RELATED APPLICATIONS

This application is a continuation-in-part of U.S. provisional patent application Ser. No. 60/105,891 filed on Oct. 26, 1998, which is herein incorporated by reference, and is related to co-pending and co-filed applications titled "System and Method for Authenticating an Operating System to a Central Processing Unit, Providing the CPU/OS with Secure Storage, and Authenticating the CPU/OS to a Third Party" Ser. No. 09/266,207, filed on Mar. 10, 1999, "Loading and Identifying a Digital Rights Management Operating System" Ser. No. 09/227,611, filed on Jan. 8, 1999, "Key-based Secure Storage" Ser. No. 09/227,568, filed Jan. 8, 1999, and "Digital Rights Management Using One Or More Access Prediates, Rights Manager Certificates, And Licenses" Ser. No. 09/227,559. filed Jan. 8, 1999.

FIELD OF THE INVENTION

This invention relates generally to computer operating systems, and more particularly to booting and identifying an operating system that enforces digital rights.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1998, Microsoft Corporation, All Rights Reserved.

BACKGROUND OF THE INVENTION

More and more content is being delivered in digital form, and more and more digital content is being delivered online over private and public networks, such as Intranets, the Internet and cable TV networks. For a client, digital form allows more sophisticated content, while online delivery improves timeliness and convenience. For a publisher, digital content also reduces delivery costs. Unfortunately, these worthwhile attributes are often outweighed in the minds of publishers by the corresponding disadvantage that online information delivery makes it relatively easy to obtain pristine digital content and to pirate the content at the expense and harm of the publisher.

Piracy of digital content, especially online digital content, is not yet a great problem. Most premium content that is available on the Web is of low value, and therefore casual and organized pirates do not yet see an attractive business stealing and reselling content. Increasingly, though, higher-value content is becoming available. Books and audio recordings are available now, and as bandwidths increase, video content will start to appear. With the increase in value of online digital content, the attractiveness of organized and casual theft increases.

The unusual property of digital content is that the publisher (or reseller) gives or sells the content to a client, but continues to restrict rights to use the content even after the content is under the sole physical control of the client. For instance, a publisher will typically retain copyright to a work so that the client cannot reproduce or publish the work without permission. A publisher could also adjust pricing according to whether the client is allowed to make a persistent copy, or is just allowed to view the content online as it is delivered. These scenarios reveal a peculiar arrangement. The user that possesses the digital bits often does not have full rights to their use; instead, the provider retains at least some of the rights. In a very real sense, the legitimate user of a computer can be an adversary of the data or content provider. "Digital rights management" is therefore fast becoming a central requirement if online commerce is to continue its rapid growth. Content providers and the computer industry must quickly provide technologies and protocols for ensuring that digital content is properly handled in accordance with the rights granted by the publisher. If measures are not taken, traditional content providers may be put out of business by widespread theft, or, more likely, will refuse altogether to deliver content online.

Traditional security systems ill serve this problem. There are highly secure schemes for encrypting data on networks, authenticating users, revoking certificates, and storing data securely. Unfortunately, none of these systems address the assurance of content security after it has been delivered to a client's machine. Traditional uses of smart cards offer little help. Smart cards merely provide authentication, storage, and encryption capabilities. Ultimately, useful content must be assembled within the host machine for display, and again, at this point the bits are subject to theft. Cryptographic coprocessors provide higher-performance cryptographic operations, and are usually programmable but again, fundamentally, any operating system or sufficiently privileged application, trusted or not, can use the services of the cryptographic processor.

There appear to be three solutions to this problem. One solution is to do away with general-purpose computing devices and use special-purpose tamper-resistant boxes for delivery, storage, and display of secure content. This is the approach adopted by the cable industry and their set-top boxes, and looks set to be the model for DVD-video presentation. The second solution is to use secret, proprietary data formats and applications software, or to use tamper-resistant software containers, in the hope that the resulting complexity will substantially impede piracy. The third solution is to modify the general-purpose computer to support a general model of client-side content security and digital rights management.

This invention is directed to a system and methodology that falls generally into the third category of solutions.

A fundamental building block for client-side content security is a secure operating system. If a computer can be booted only into an operating system that itself honors content rights, and allows only compliant applications to access rights-restricted data, then data integrity within the machine can be assured. This stepping-stone to a secure operating system is sometimes called "Secure Boot." If secure boot cannot be assured, then whatever rights management system the secure OS provides, the computer can always be booted into an insecure operating system as a step to compromise it.

Secure boot of an operating system is usually a multi-stage process. A securely booted computer runs a trusted program at startup. The trusted program loads an initial layer of the operating system and checks its integrity (by using a code signature or by other means) before allowing it to run. This layer will in turn load and check the succeeding layers. This proceeds all the way to loading trusted (signed) device drivers, and finally the trusted application(s).

An article by B. Lampson, M. Abadi, and M. Burrows, entitled "Authentication in Distributed Systems: Theory and Practice," ACM Transactions on Computer Systems v10, 265, 1992, describes in general terms the requirements for securely booting an operating system. The only hardware assist is a register that holds a machine secret. When boot begins this register becomes readable, and there's a hardware operation to make this secret unreadable. Once it's unreadable, it stays unreadable until the next boot. The boot code mints a public-key pair and a certificate that the operating system can use to authenticate itself to other parties in order to establish trust. We note that in this scheme, a malicious user can easily subvert security by replacing the boot code.

Clark and Hoffman's BITS system is designed to support secure boot from a smart card. P. C. Clark and L. J. Hoffman, "BITS: A Smartcard Operating System," Comm. ACM. 37, 66, 1994. In their design, the smart card holds the boot sector, and PCs are designed to boot from the smart card. The smart card continues to be involved in the boot process (for example, the smart card holds the signatures or keys of other parts of the OS).

Bennet Yee describes a scheme in which a secure processor first gets control of the booting machine. B. Yee, "Using Secure Coprocessors", Ph.D. Thesis, Carnegie Mellon University, 1994. The secure processor can check code integrity before loading other systems. One of the nice features of this scheme is that there is a tamper-resistant device that can later be queried for the details of the running operating system.

Another secure boot model, known as AEGIS, is disclosed by W. Arbaugh, D. G. Farber, and J. M Smith in a paper entitled "A Secure and Reliable Bootstrap Architecture", Univ. of Penn. Dept. of CIS Technical Report, IEEE Symposium on Security and Privacy, page 65, 1997. This AEGIS model requires a tamper-resistant BIOS that has hard-wired into it the signature of the following stage. This scheme has the very considerable advantage that it works well with current microprocessors and the current PC architecture, but has three drawbacks. First, the set of trusted operating systems or trusted publishers must be wired into the BIOS. Second, if the content is valuable enough (for instance, e-cash or Hollywood videos), users will find a way of replacing the BIOS with one that permits an insecure boot. Third, when obtaining data from a network server, the client has no way of proving to the remote server that it is indeed running a trusted system.

On the more general subject of client-side rights management, several systems exist or have been proposed to encapsulate data and rights in a tamper-resistant software package. An early example is IBM's Cryptolope. Another existent commercial implementation of a rights management system has been developed by Intertrust. In the audio domain, AT&T Research have proposed their "A2b" audio rights management system based on the PolicyMaker rights management system.

Therefore, there is a need in the art for a digital rights management operating system that protects the rights of the content provider while operating on a general-purpose personal computer without requiring additional hardware directed at securing downloaded content.

SUMMARY OF THE INVENTION

The above-mentioned shortcomings, disadvantages and problems are addressed by the present invention, which will be understood by reading and studying the following specification.

A digital rights management operating system protects rights-managed data, such as downloaded content, from access by untrusted programs while the data is loaded into memory or on a page file as a result of the execution of a trusted application that accesses the memory. To protect the rights-managed data resident in memory, the digital rights management operating system refuses to load an untrusted program into memory while the trusted application is executing or removes the data from memory before loading the untrusted program. In the latter instance, the digital rights management system can terminate the trusted application as well. If the untrusted program executes at the operating system level, such as a debugger, the digital rights management operating system renounces a trusted identity created for it by the computer processor when the computer was booted. To protect the rights-managed data on the page file, the digital rights management operating system prohibits raw access to the page file, or erases the data from the page file before allowing such access. Alternatively, the digital rights management operating system can encrypt the rights-managed data prior to writing it to the page file.

In one aspect of the invention, the digital rights management operating system also provides a trusted clock mechanism so that a user cannot reset the computer's clock to circumvent time restrictions placed on trusted components. In other aspects of the invention, the digital rights management operating system limits the functions the user can perform on the rights-managed data and the trusted application.

Thus, the digital rights management system of the present invention protects content downloaded to a general-purpose personal computer and does so within the framework of a standard operating system, alleviating the need for additional and specialized hardware.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 1A is a diagram of the hardware and operating environment in conjunction with which exemplary embodiments of the invention may be practiced;

FIGS. 7A, 7B and 7C are block diagrams of boot blocks for use in an exemplary embodiment of the invention;

FIG. 10 is a diagram of a required properties access control list data structure for use in an exemplary implementation of the invention; and FIG. 11 is a diagram of a license data structure for use in an exemplary implementation of the invention.

DETAILED DESCRIPTION OF THE INVENTION

Figure 14:
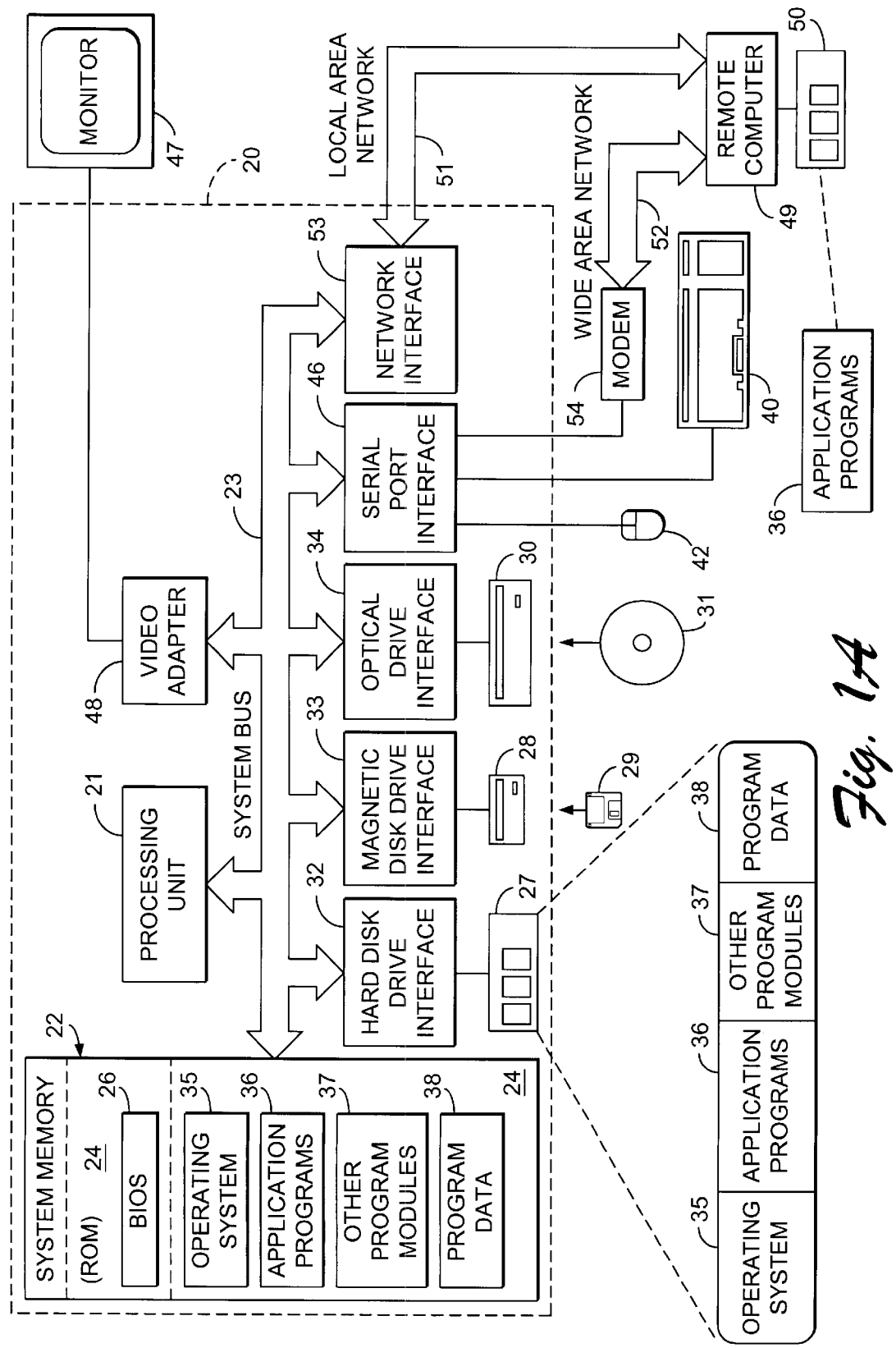

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. The third section described methods and data structures employed by various exemplary embodiments of the invention. Finally, in the fourth section, a conclusion of the detailed description is provided.

Hardware and Operating Environment

FIG. 1A is a diagram of the hardware and operating environment in conjunction with which embodiments of the invention may be practiced. The description of FIG. 1A is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1A for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments arc commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

Figure 1B:
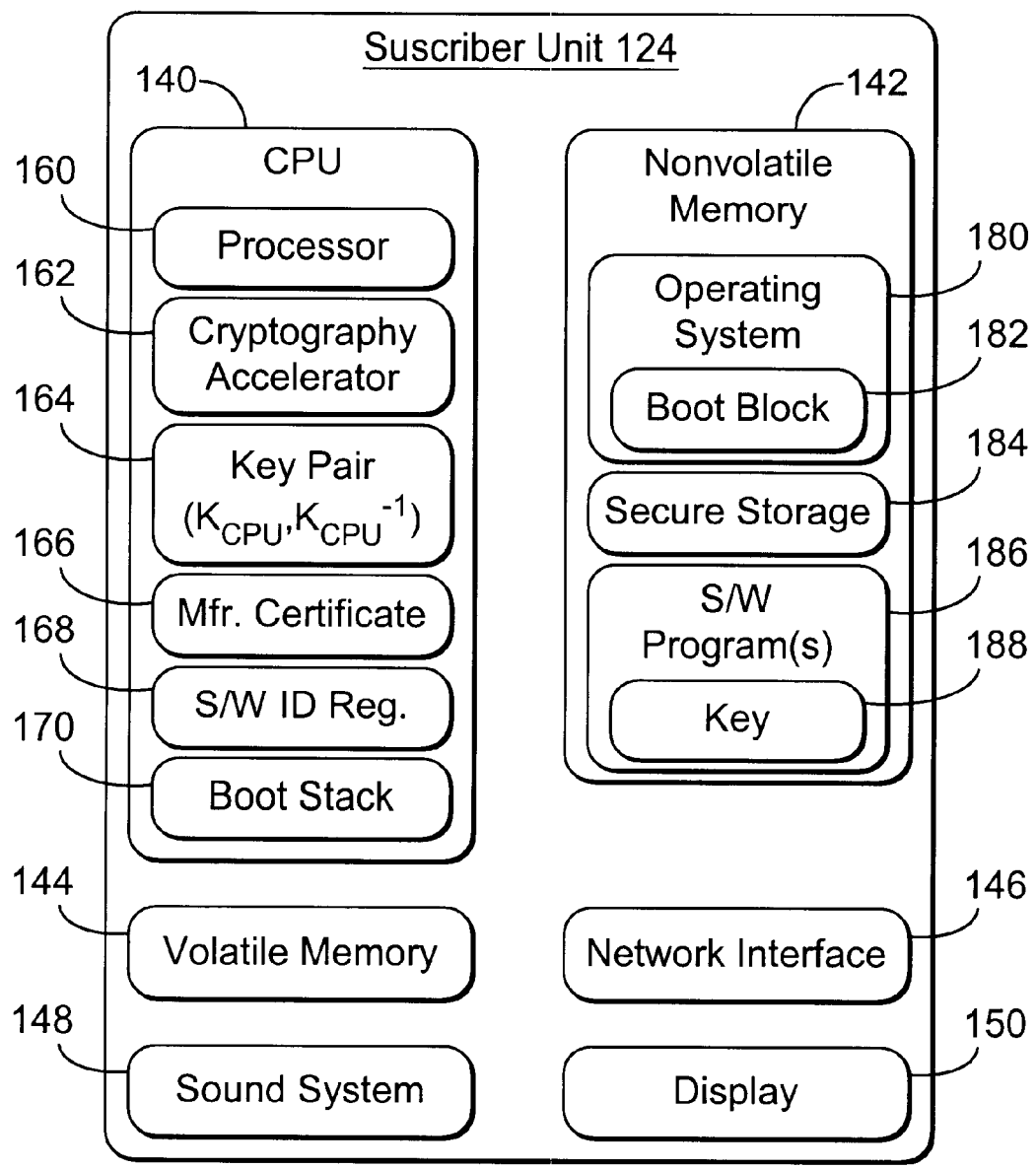
FIG. 1B is a diagram of a client computer for use with exemplary embodiments of the invention.

One exemplary embodiment of a suitable client computer is described in the related application titled "System and Method for Authenticating an Operating System to a Central Processing Unit, Providing the CPU/OS with Secure Storage, and Authenticating the CPU/OS to a Third Party," and illustrated in FIG. 1B as subscriber unit 124. The CPU 140 in the subscriber unit 124 is able to authenticate the identity of the boot block and OS components that have been loaded into the computer, and to provide quoting and secure storage operations based on this identity as briefly described next. Full descriptions of various embodiments for the subscriber unit 124 are provided in the related application.

The CPU 140 has a processor 160 and also can have a cryptographic accelerator 162. The CPU 140 is capable of performing cryptographic functions, such as signing, encrypting, decrypting, and authenticating, with or without the accelerator 162 assisting in intensive mathematical computations commonly involved in cryptographic functions.

The CPU manufacturer equips the CPU 140 with a pair of public and private keys 164 that is unique to the CPU. For discussion purpose, the CPU's public key is referred to as "$K_{CPU}$" and the corresponding private key is referred to as "$K_{CPU}^{-1}$". Other physical implementations may include storing the key on an external device to which the main CPU has privileged access (where the stored secrets are inaccessible to arbitrary application or operating systems code). The private key is never revealed and is used only for the specific purpose of signing stylized statements, such as when responding to challenges from a content provider, as is discussed below.

The manufacturer also issues a signed certificate 166 testifying that it produced the CPU according to a known specification. Generally, the certificate testifies that the manufacturer created the key pair 164, placed the key pair onto the CPU 140, and then destroyed its own knowledge of the private key "$K_{CPU}^{-1}$". In this way, only the CPU knows the CPU private key $K_{CPU}^{-1}$; the same key is not issued to other CPUs and the manufacturer keeps no record of it. The certificate can in principle be stored on a separate physical device associated with the processor but still logically belongs to the processor with the corresponding key.

The manufacturer has a pair of public and private signing keys, $K_{MFR}$ and $K_{MFR}^{-1}$. The private key $K_{MFR}^{-1}$ is known only to the manufacturer, while the public key $K_{MFR}$ is made available to the public. The manufacturer certificate 166 contains the manufacturer's public key $K_{MFR}$, the CPU's public key $K_{CPU}$, and the above testimony. The manufacture signs the certificate using its private signing key, $K_{MFR}^{-1}$, as follows:

Mfr. Certificate=($K_{MFR}$, Certifies-for-Boot, $K_{CPU}$), signed by $K_{MFR}^{-1}$ The predicate "certifies-for-boot" is a pledge by the manufacturer that it created the CPU and the CPU key pair according to a known specification. The pledge further states that the CPU can correctly perform authenticated boot procedures, as are described below in more detail. The manufacturer certificate 166 is publicly accessible, yet it cannot be forged without knowledge of the manufacturer's private key $K_{MFR}^{-1}$.

The CPU 140 has an internal software identity register (SIR) 168, which contains the identity of an authenticated operating system 180 or a predetermined false value (e.g., zero) if the CPU determines that the operating system 180 cannot be authenticated. The operating system (OS) 180 is stored in the memory 142 and executed on the CPU 140. The operating system 180 has a block of code 182 that is used to authenticate the operating system to the CPU during the boot operation. The boot block 182 uniquely determines the operating system, or class of operating systems (e.g. those signed by the same manufacturer). The boot block 182 can also be signed by the OS manufacturer.

System Level Overview

A system level overview of the operation of an exemplary embodiment of the invention is described by reference to FIG. 2. A subscriber computer 200, such as client computer 20 in FIG. 1, is connected to a content provider server computer 220, such as remote computer 49, through a wide-area network, such as WAN 52. Processes performed by the components of the subscriber computer 200 and the content provider 220 are illustrated by arrows in FIG. 2. Many of these processes incorporate either public/private key pairs, digital signatures, digital certificates, and/or encryption algorithms, or a combination of these standard cryptographic functions. Such functions are assumed to be provided by the CPU of the subscriber computer in the descriptions that follow, but can be provided by other well-known cryptographic mechanisms as will be immediately understood by one skilled in the art.

To prevent their content from being stolen or misused, content providers will download content only to known software, and therefore only to subscriber computers that can prove that their operating systems will enforce the limitations the provider places on the content. Such a digital rights management operating system (DRMOS) must load and execute only OS components that are authenticated as respecting digital rights ("trusted"), and must allow access to the downloaded content by only similarly trusted applications.

The first requirement is met in the exemplary embodiment of the invention by having all trusted operating system-level components digitally signed by their developers or a trusted third-party, with the signature acting as a guarantee that the components respect digital rights. The signature is validated before the component is loaded. The resulting DRMOS is assigned a unique trusted identity, as explained in detail below, which is recorded in an internal register in the CPU, such as SIR 168 in FIG. 1B. FIG. 2 illustrates a DRMOS 205, with its identity 206, after it has been loaded into the CPU 201 of a subscriber computer 200 through such a loading process 1.

The second requirement has two aspects. First, trusted applications must be identified in some fashion, and, second, the DRMOS must prevent non-trusted applications from gaining access to the content when it is stored, either permanently or temporarily, on the subscriber computer.

Figure 2:
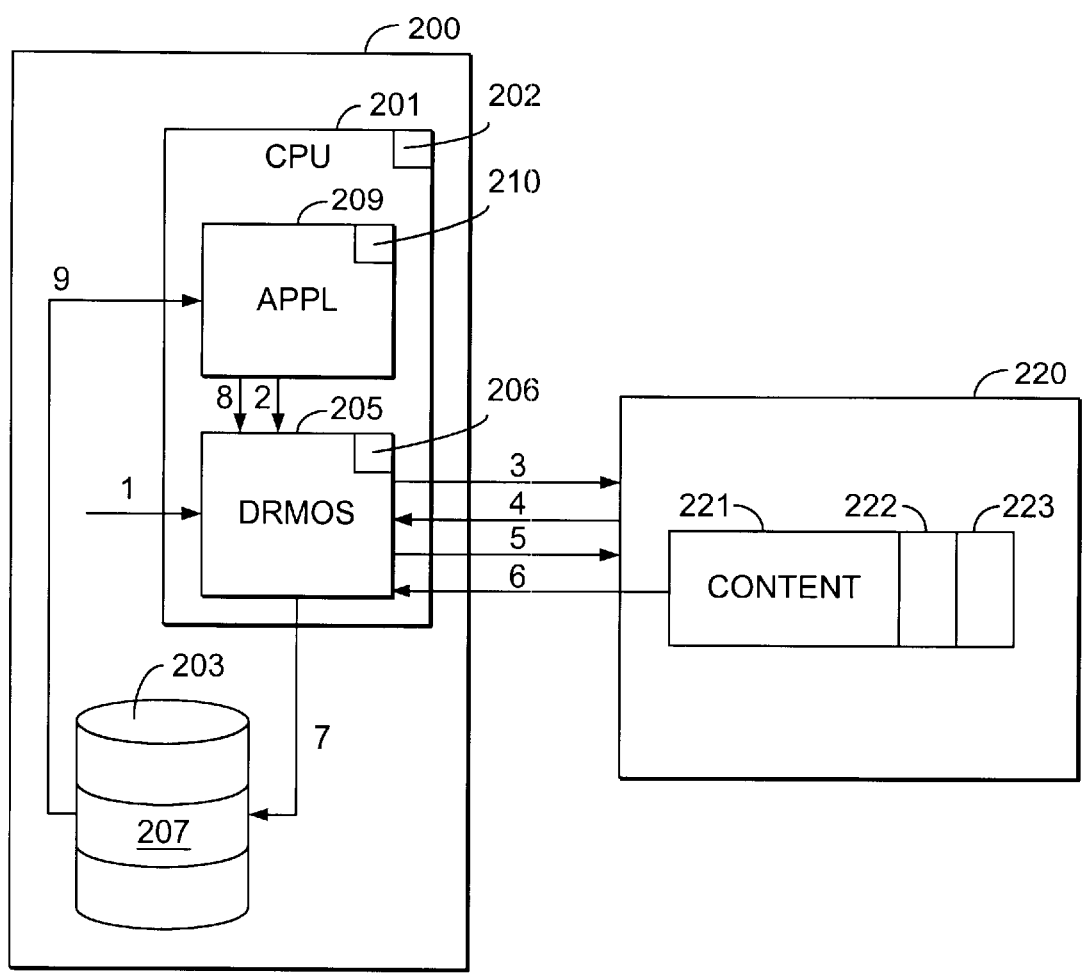
FIG. 2 is a diagram illustrating a system-level overview of an exemplary embodiment of the invention.

In the exemplary embodiment shown in FIG. 2, a trusted application 209 has agreed to operate in accordance with the limitations placed on content by a provider. The trusted application 209 is identified through a "rights manager" certificate 210. In one embodiment, the rights manager certificate 210 extends a standard digital certificate, which includes such items as date of publication and name of the application, by adding a list of services, or properties, provided by the application, i.e., content type handled, version of the application, whether it saves content to disk, etc. For purposes of the exemplary embodiment shown in FIG. 2, the certificate 210 also identifies the trusted application; alternate mechanisms for identifying a trusted application are described later in the methods section.

The DRMOS 205 provides key-secured storage for permanently stored content to prevent unauthorized access to the content. For temporarily stored content, the DRMOS 205 prevents an untrusted process from reading the memory holding the content. These and other safeguards are also described in detail below. The permanent and temporary storage within subscriber computer 200 are collectively represented by device 203, which is illustrated in FIG. 2 as a disk drive. Such illustration is not intended to limit the range of devices that can serve as secured storage for a DRMOS.

Turning now to the remainder of the processes depicted in FIG. 2, application 209 requests 2 the download of content 221 from provider 220. The DRMOS 205 sends a message 3 to the provider 220 requesting the content 221. The content provider 220 transmits a challenge message 4 to the DRMOS 205 asking for the identity of the CPU 201, the DRMOS 205, and the application 209. The DRMOS 205 transmits a response message 5 containing a certificate 202 for the CPU 201, its own identity 206, and the rights manager certificate 210 for the application 209.

The challenge-response process follows the common protocol for such interchanges, the difference being only in the data exchanged between the subscriber computer and the content provider. In one exemplary embodiment of a suitable challenge-response process described in the related application titled "System and Method for Authenticating an Operating System to a Central Processing Unit, Providing the CPU/OS with Secure Storage, and Authenticating the CPU/OS to a Third Party," the certificate 202 contains the challenge message 3, the identity of the DRMOS 206, the public key of the CPU 201, and data representing all software components that are currently loaded and executing on the subscriber computer 200. The certificate 202 is signed using the private key of the CPU 201. The content provider 220 examines the CPU certificate 202, the DRMOS identity 206, and the properties specified in the rights manager certificate 210 to determine whether it should establish a trust relationship with the DRMOS 205 on the subscriber computer 200.

In an alternate exemplary embodiment, the challenge-response protocol runs over a secure connection such as SSL (Secure Socket Layer) or TLS (Transport Level Security), which relies on a session key to encrypt the data transferred between the subscriber computer 200 and the content provider 220. This stops an attacker (such as the legitimate owner of the machine) from rebooting the PC into a different operating system after the DRMOS has authenticated itself, or using a different computer on the network for snooping on the data destined for the DRMOS.

If the trust relationship is established, the provider downloads 6 the content 221, an access predicate 222, and a "license" 223 to the DRMOS 205 on the subscriber computer 200. The access predicate 222 specifies the properties that an application must have in order to process the content 221, such as read-only or minimum/maximum video resolution. The access predicate 222 may also specify specific applications or families of applications allowed to process the content 221. The license 223 places restrictions on the use of the content 221 by an approved application, such as the number of times the content can be accessed or what derivative use can be made of the content.

When the DRMOS 205 receives the content 221, the access predicate 222 and the license 223, it determines whether the content should be permanently stored in a key-secured storage. If so, it requests an application storage key from the CPU 201. In the present example, the application storage key is specific to the application 209 that requested the content 221. The content 221 and the license 223 are encrypted using the application storage key and the access predicate 222 is attached to the encrypted information. If the content 221 is to be stored only temporarily, the DRMOS 205 places various safeguards around the memory area holding the content so that the content cannot be accessed by an untrusted application. The generation of application storage keys and the memory safeguards are described in detail below.

Each time application 209 wants to access the stored content 221, it passes its rights manager certificate 210 and the appropriate application storage key (action 8) to the DRMOS 205. The DRMOS 205 validates the key and compares the rights manager certificate 210 against the access predicate 222. Assuming the storage key is authenticated and the rights manager certificate 210 satisfies the access predicate 222, the content 221 and the license 223 are decrypted. The DRMOS determines if the application's use of the content is permitted under the license 223 and allows access 9 if it is.

The system level overview of the operation of an exemplary embodiment of the invention has been described in this section of the detailed description. A series of processes and data structures on a subscriber computer control the loading of a digital rights management operating system, identify the DRMOS and trusted applications to a content provider, and secure content downloaded by the provider to the subscriber computer. While the invention is not limited to any particular hardware and software, for sake of clarity only a minimal hardware and software configuration necessary to process multimedia has been assumed for the subscriber computer.

Methods of Exemplary Embodiments of the Invention

In the previous section, a system level overview of the operation of exemplary embodiments of the invention was described. In this section, the particular methods performed by a subscriber computer, or client, of such exemplary embodiments are described by reference to a series of flowcharts and operational diagrams. The methods to be performed by the client constitute computer programs made up of computer-executable instructions. Describing the methods by reference to flowcharts and operational diagrams enables one skilled in the art to develop such programs including such instructions to carry out the methods on suitable computerized clients (e.g., on the processor of a client executing the instructions from computer-readable media). Data structures necessary to perform the methods are also described in this section. The methods of the content provider server computer are described to complete the understanding of the methods performed by the client.

Although many of the methods are interrelated, they have been divided into four groups to facilitate understanding. The boot/load process and various mechanisms for creating identities for different versions of a digital right management operating system (DRMOS) are first described. The functions that must be provided by the DRMOS to ensure the enforcement of the content providers' rights are described next. The third group consists of methods directed toward providing permanent storage of the content on the subscriber computer once downloaded, and protecting that content from unauthorized access. Finally, the identification of trusted applications and the rights management functions are described.

Booting/Loading and Identifying the DRMOS

Figure 3:
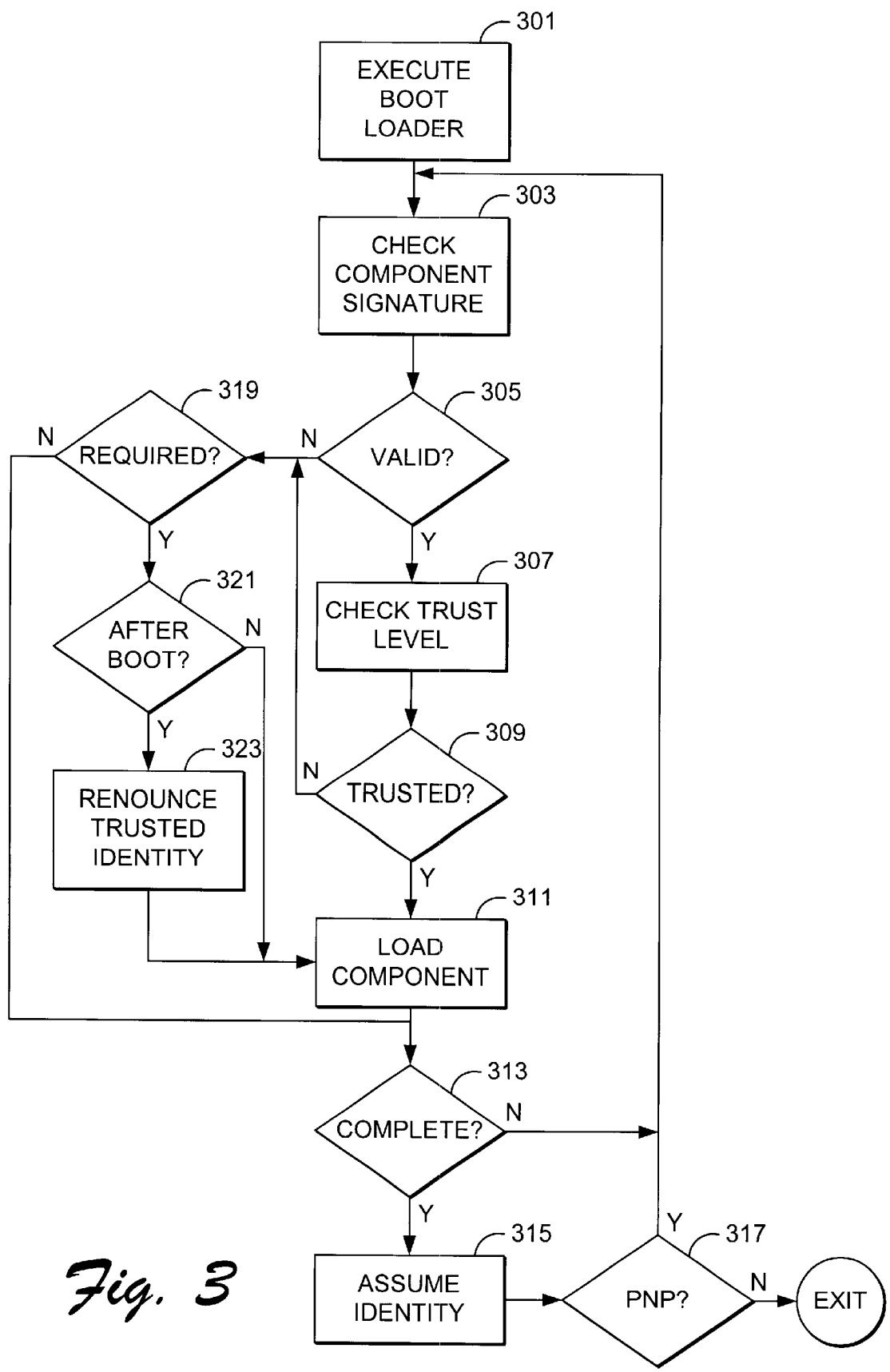
FIG. 3 is a flowchart of a method to be performed by a client when booting or loading system components according to an exemplary embodiment of the invention.

Referring first to FIG. 3, a flowchart of a method to be performed by a subscriber computer according to an exemplary embodiment of the invention is shown. This method is inclusive of the acts required to be taken by the computer to boot a DRMOS or to load additional components after the boot process is complete. Exemplary embodiments of boot block data structures are described below in conjunction with FIGS. 7A–C.

Shortly after a computer is turned on or is reset, a small program called a boot loader is executed by the CPU (block 301). The boot loader loads a boot block for a particular operating system. Code in the boot block then loads various drivers and other software components necessary for the operating system to function on the computer. The totality of the boot block and the loaded components make up the identity of the operating system.

For a DRMOS, that identity can be trusted only if the boot block and the loaded components are trusted. In the embodiments described herein, all components are signed by a trusted source and provided with a rights manager certificate. An exemplary embodiment of the rights manager certificate is described below in conjunction with FIG. 9.

The operating system checks the signature of a component before loading it (block 303). If the signature is valid (block 305), the component has not been compromised by someone attempting to circumvent the boot process and the process proceeds to check the level of trust assigned to the component (block 307). If the signature is not valid (or if there is no signature) but the component must be loaded (block 319), the operating system will not assume the identity of a DRMOS upon completion of the boot process as explained further below.

A plug-and-play operating system provides an environment in which devices and their supporting software components can be added to the computer during normal operation rather than requiring all components be loaded during the boot process. If the device requires the loading of an untrusted component after the boot process completes, a plug-and-play DRMOS must then "renounce" its trusted identity and terminate any executing trusted applications (block 323) before loading the component. The determination that an untrusted component must be loaded can be based on a system configuration parameter or on instructions from the user of the computer.

Assuming the signature is valid (block 305) and the component is trusted (block 309), it is loaded (block 311). The trustworthiness of a component can be decided using various criteria. In one embodiment, only components provided by the operating system developer are trusted. At the other end of the scale, in another embodiment, all components are assumed trustworthy by the DRMOS, leaving the final decision to the content provider as described in more detail below. Still a third alternate embodiment provides that components signed by any of a select number of entities can be considered as equivalent to components provided by the DRMOS developer. In this embodiment, the identity of the resulting operating system is considered equivalent to the "pure" DRMOS provided by the DRMOS developer. The content provider decides whether it trusts the equivalent operating system.

Figure 4:
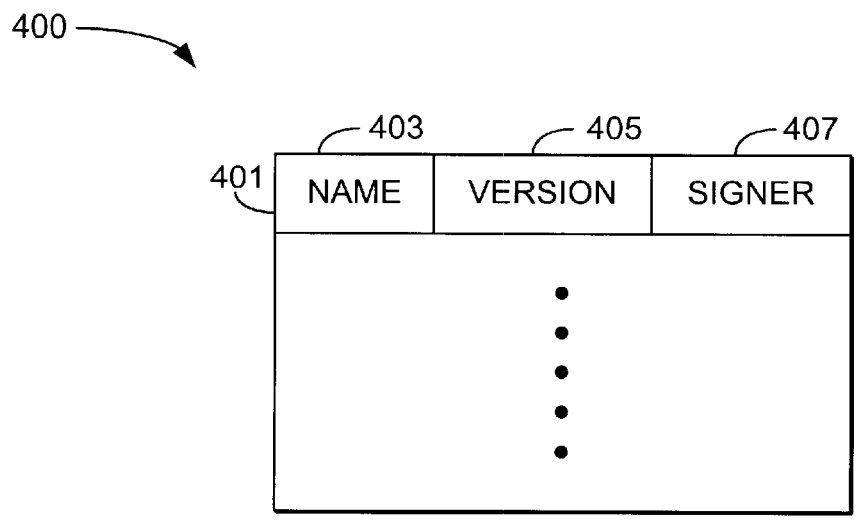
FIG. 4 is a diagram of a certificate revocation list data structure for use in an exemplary implementation of the invention.

Furthermore, not all versions of a component may be trusted. Because the rights manager certificate contains the version number of the component, it can be used to verify the trust level of a particular version. One embodiment of the loading process checks a component certification revocation list (CRL) to determine whether a component signature has been revoked. The CRL can be provided by the content provider or the DRMOS developer. An exemplary embodiment of a CRL is illustrated in FIG. 4. Each entry 401 contains the name of the component 403, the version 405, and the signer 407 whose signature is revoked. The particular CRL used becomes part of the operating system identity using a standard hashing functions described further below.

Alternatively, if the rights manager certificates on the components are short-lived and must be renewed periodically, then a version that is found to be untrustworthy will not have its certificate renewed. This alternate embodiment requires a secure time source to be available on the subscriber computer so the user cannot simply turn back the system clock on the subscriber computer. A monotonic counter in the CPU can serve as this secure time source since it only counts up and cannot be reset "back in time." For example, a monotonic counter that is periodically incremented while the CPU is active, and that cannot be reset, can be used in conjunction with a secure time service, such as a secure Internet time service, to provide a lower bound on the current time in a trusted manner. Such exemplary use of a monotonic counter is described in detail below as part of the functions of the DRMOS.

Once all components are loaded, the operating system assumes its identity (block 315). In one embodiment, a one-way hashing function provided by the CPU is used to create a cryptographic "digest" of all the loaded components. The digest becomes the identity for the operating system and is recorded in an internal register in the CPU. Alternate methodologies of assigning an identity to the loaded components are equally applicable as long as a non-trusted configuration cannot have the same identity as a DRMOS. Signing the operating system identity with a private key particular to the type of CPU serves to identify both the operating system and the processor on which it is executing.

If all computers were identically configured, a single, signed operating system identity would suffice to authenticate a particular operating system executing on a particular type of CPU. However, computers contain a myriad different hardware components, and the corresponding supporting software components are frequently updated to add enhancements and fix problems, resulting in a virtually unlimited number of operating system identities. Therefore, the content provider would have to maintain a registry of each subscriber's DRMOS identity or delegate that function to a trusted third party.

The problems attendant on having a vast number of DRMOS identities can be alleviated in at least three ways. First, an identity is generated or assigned for the basic configuration of each operating system. Such a basic configuration includes only components supplied by the operating system vendor. The identity is generated (or assigned) and stored when the basic components have been loaded. Different versions of the basic operating system will generate (or be assigned) different identities.

Once the basic configuration of a DRMOS is loaded and its trusted identity is stored, subsequent components required to support the particular hardware configuration must be verified and loaded as explained in conjunction with FIG. 3. Such additional software components can also include updates to the basic components provided by vendors other than the operating system developer. Each additional loaded component has an individual identity (such as a cryptographic digest) generated/assigned and stored. All the identities are uploaded to the content provider when the DRMOS identity is requested. Because the basic DRMOS and additional components always have the same identities when executing on a specific type of processor, the content provider has only to maintain a list of the identities for the combinations of the basic DRMOS and additional components that the provider trusts. Each identity uploaded is then checked against the list.

In a second alternate embodiment, the operating system maintains a "boot log," containing the identity of the basic DRMOS and the identities of the additional OS components that have been loaded. The identity is a cryptographic digest of the code for the component, or a well-known name, or any other string that is uniquely associated with the component. The CPU also maintains a composite identity register that holds a one-way cryptographic function of the boot log. Whenever a component is loaded, its identity is appended to the boot log and folded into the composite identity register, such as by setting this register to a secure hash of its old value appended with the new component's identity. Whenever the CPU certifies the current value of its composite identity register, it also verifies that the operating system's boot log has not been tampered with. Because the log is indelible, the loaded component cannot erase the record that shows it was loaded.

An alternate exemplary embodiment of the boot log holds the entire boot log in the CPU. The DRMOS uses an instruction provided by the CPU that appends the identity of each loaded component to the log. The CPU then signs the boot log to attest to its validity and delivers the signed boot log to the content provider as the identity for the DRMOS.

Figure 6:
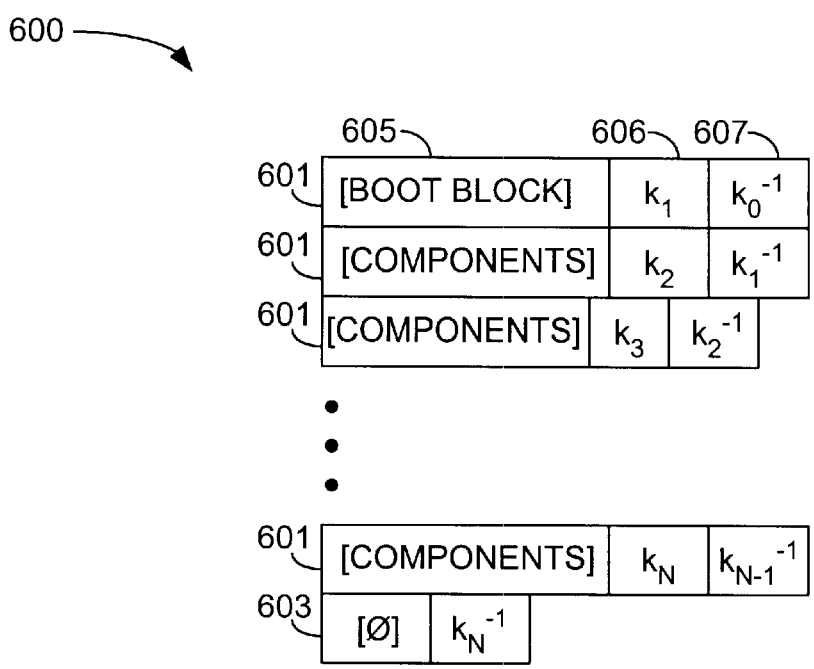
FIG. 6 is a block diagram of an exemplary boot log created using the method of FIG. 5.
Figure 5:
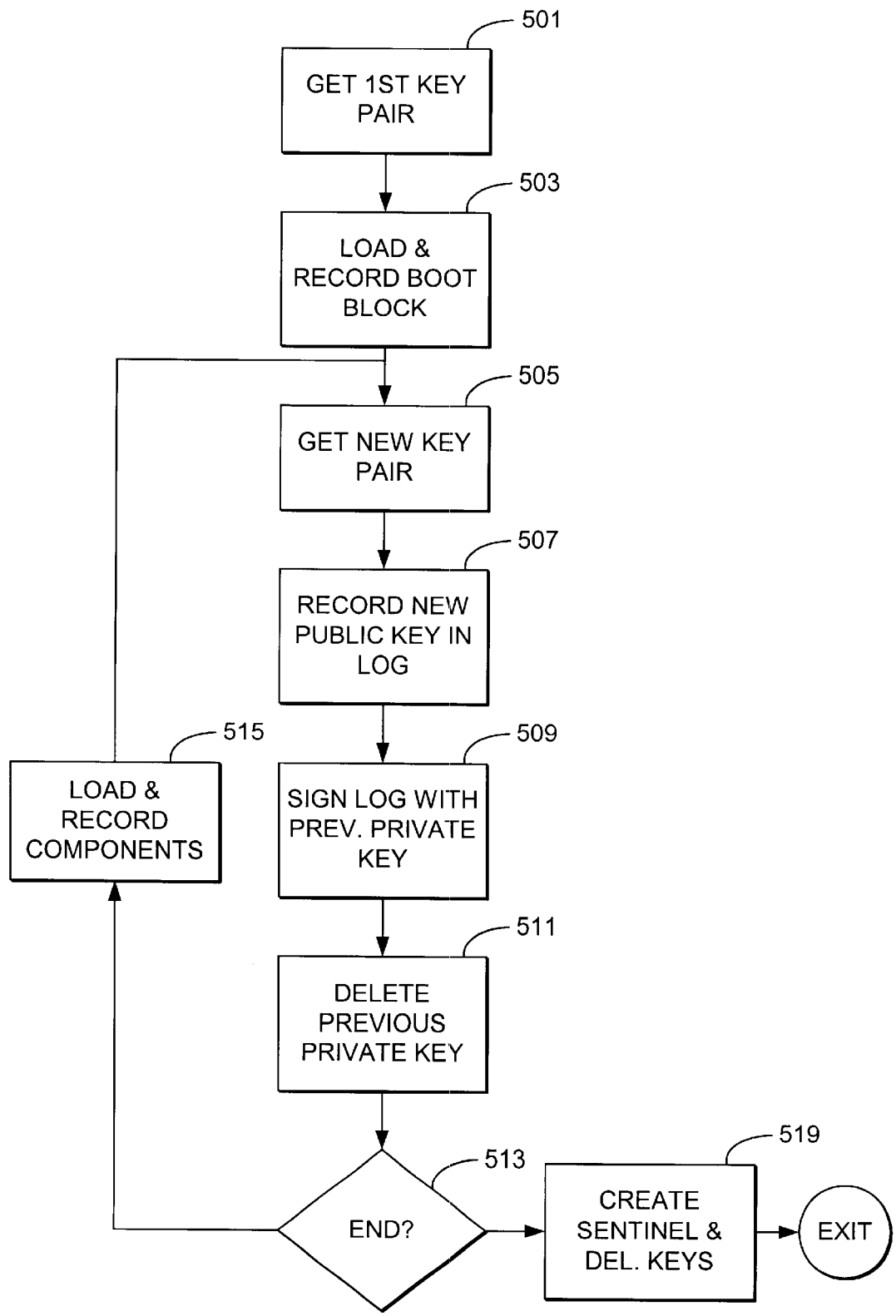
FIG. 5 is a flowchart of a method to be performed by a client to create a boot log according to an exemplary embodiment of the invention.

In another alternate embodiment, DRMOS uses a chain of public and private key pairs newly generated by the CPU to create an indelible boot log. The method is shown in FIG. 5 and an exemplary embodiment of the completed boot log is illustrated in FIG. 6. The boot loader generates or obtains a first key pair ($K_0$, $K_0^{-1}$) and records the first key pair in memory (block 501). The first public key is also saved to secure storage in the CPU. The boot loader loads the boot block into memory and records the identity of the boot block in the boot log (block 503). Before turning control over to the boot block code, the boot loader obtains a second key pair ($K_1$, $K_1^{-1}$) (block 505), writes the second public key ($K_1$) to the boot log (block 507), and then signs the boot log with the first private key ($K_0^{-1}$) (block 509). The boot loader deletes the first private key ($K_0^{-1}$) from its memory (block 511) and relinquishes control to the boot block.

The boot block code loads additional components into memory, records the identities of those components to the boot log (block 515), obtains a third key pair ($K_2$, $K_2^{-1}$) (block 505), appends the boot log with the third public key ($K_2$) (block 507), and signs its portion of the boot log with the second private key $K_1^{-1}$ (block 509). The boot block erases the second private key ($K_1^{-1}$) (block 511) from memory and turns control of the boot process over to the first loaded component. Each loaded component that will load additional components obtains a new key pair ($K_{n, K_n}^{-1}$) and uses the private key of the previous key pair ($K_{n-1}^{-1}$) to sign its portion of the boot log. The boot process continues in this iterative manner through until all components are loaded or, in the case of a plug-and-and play DRMOS, a content provider challenge is received (block 513).

When a non-plug-and-play DRMOS resumes control after the final component is loaded, it places a "sentinel" on the boot log (block 519) to indicate that the log is complete and to prevent a loaded component from deleting entire lines of the log. The characteristics of the sentinel are that is a known, unique value that is signed using the last private key ($K_n^{-1}$). In the present embodiment, the sentinel is a signed zero entry. The DRMOS deletes the last private key and all public keys from memory after creating the sentinel.

Because a plug-and-play DRMOS cannot arbitrarily declare that all components are loaded at the end of the boot process, the DRMOS cannot add a sentinel to the end of the boot log at that time. Instead, the DRMOS attests to its most recent public key $K_n$ as well as its first public key $K_0$ to certify the contents of the boot log when challenged.

Using a chain of key pairs 606, 607, as shown in FIG. 6, guarantees the boot log reflects the loaded components. Each public key in a log section is used to authenticate the signature on the next section. The first public key remains in memory to authenticate the signature on the boot block section of the log. While each set of components is free to load more components, a component cannot change the recording of its identity in a previous portion of the log because doing so would cause the validity check on the corresponding signature to fail. Similarly, a section in the middle of the log cannot be deleted because that would break the chain of keys. Deleting multiple sections of the log through to the end also breaks the chain. In this case, attempting to insert a new sentinel in an effort to make the log appear unaltered will fail because the private key necessary to add the sentinel is no longer available. Finally, the entire boot log cannot be replaced since the signature on the boot block section of the log would not be validated by the first public key.

Turning now to the boot block, one exemplary embodiment suitable for use with a digital rights management operating system is shown in FIG. 7A. The boot code 701 is signed (signature 703) by the developer of the DRMOS using its private key. The corresponding public key 705 of the developer is attached to the boot block 700. In an alternate embodiment, the public key 705 is not attached to the boot block 700, but instead is persistently stored in an internal register in the CPU. The public key 705 is used to validate the signature 703.

If the DRMOS developer's private key used to sign the boot block is compromised, the key pair must be changed and thus all boot blocks must be reissued to subscriber computers. FIG. 7B illustrates an alternate embodiment of a boot block that ameliorates this problem. Boot block 710 comprises a basic boot section 711 and an intermediate boot section 713. The basic boot section 711 contains boot code 715 that validates and loads the intermediate boot section 713 and components not provided by the DRMOS developer. The intermediate boot section 713 contains boot code 717 that validates and loads components from the DRMOS developer. The intermediate boot section 713 is signed with a special boot block private key. The basic boot code 715 uses a corresponding boot block public key 719 stored in the basic boot section 711 to validate the intermediate boot section 713. Components 727 from the DRMOS developer are signed 729 with the developer's standard private key and the intermediate boot section 713 uses the DRMOS developer's standard public key 721 to validate those components.

If the standard private key used to sign components is compromised, the developer creates a new standard key pair and provides a replacement intermediate boot block 713 containing the new standard public key. Replacement components signed with the new standard private key are also issued. Because the special boot block private key is used for few, if any, other purposes than signing boot blocks, it is less likely to be compromised and replacement of the basic boot section 711 will rarely be necessary.

In FIG. 7C, an alternate embodiment of the single section boot block 730 also uses a special boot block key pair. The boot block 730 contains the special boot block, or master, public key 733. The master private key is used to certify ephemeral keys that are valid for a short period of time. Certificates signed 737 by the master private key attest to the validity of the ephemeral keys. A component is signed with one of the ephemeral private keys and the corresponding certificate 739 is attached. The boot block determines that the certificate on the component is valid using the master public key. When the ephemeral key expires, the DRMOS developer issues replacement components. As with the two-section boot block shown in FIG. 7B, the master private key is only used to sign the certificates for the ephemeral keys so it is less likely to be compromised. Because the ephemeral keys are valid for only a short duration, public release of a private ephemeral key has limited impact.

Functions of a DRMOS

As described above, components may be valid only until a specified date and time, and content may also be licensed only until a certain date and time. The monotonic counter described earlier can also be used to ensure that the computer's clock cannot be set backwards to allow the replacement of a trusted component by an earlier, now untrusted version. The DRMOS connects on a regular basis to a trusted time server and presents the value of its monotonic counter, whereupon the trusted time server returns a certificate binding that value to the current time. If the monotonic counter is updated periodically, such as every hour that the DRMOS is running, then the monotonic counter in conjunction with the most recent time certificate can serve as a useful approximation to a trusted clock.

A DRMOS must also protect the content once it is loaded into the client computer's memory by a trusted application. In particular, the DRMOS must prohibit the use of certain types of programs and refrain from performing certain common operating system procedures when content is in memory.

An example of one kind of procedure that must be prohibited is loading a kernel debugger because it would allow the user to make a copy of the content loaded in memory. If the user of the subscriber computer attempts to load a kernel debugger into memory, the DRMOS can either 1) refuse to load the debugger, or 2) renounce its trusted identity and terminate the trusted application that was accessing the content before loading the debugger. In the latter case, the memory must also be purged of the content before the debugger is loaded. The choice of action can be predetermined or chosen by the user when the user attempts to load the kernel debugger. One of skill in the art will immediately identify other types of programs that will need to be treated in the same manner as a kernel debugger.

Virtual memory operating systems maintain a page file that holds sections of program code and data that are not currently active. Under normal circumstances, the contents of the page file are accessible by the user of the computer, either by running a privileged program or by booting another operating system that allows inspection of the disk. Therefore, a DRMOS must either protect content stored on the page file or must not page content and similar protected information at all.

Protecting content on the page file can be accomplished in at least three ways. First, the DRMOS can prohibit all "raw" access to page file device when a trusted application is running. Second, the DRMOS can terminate all trusted applications and erase the page file before allowing such access. Third, the DRMOS can encrypt the content and similar protected information before writing it to the page file.

Often, a DRMOS must allow the user to perform certain standard functions but prohibit other, related functions. The DRMOS can assign the user permissions based on the granularity of the normally permitted function. For example, the DRMOS can allow the user to delete an entire content file but not a portion of it. Another example is that the DRMOS can allow the user to terminate all the threads of execution for a trusted application but not just a single thread.

Figure 8:
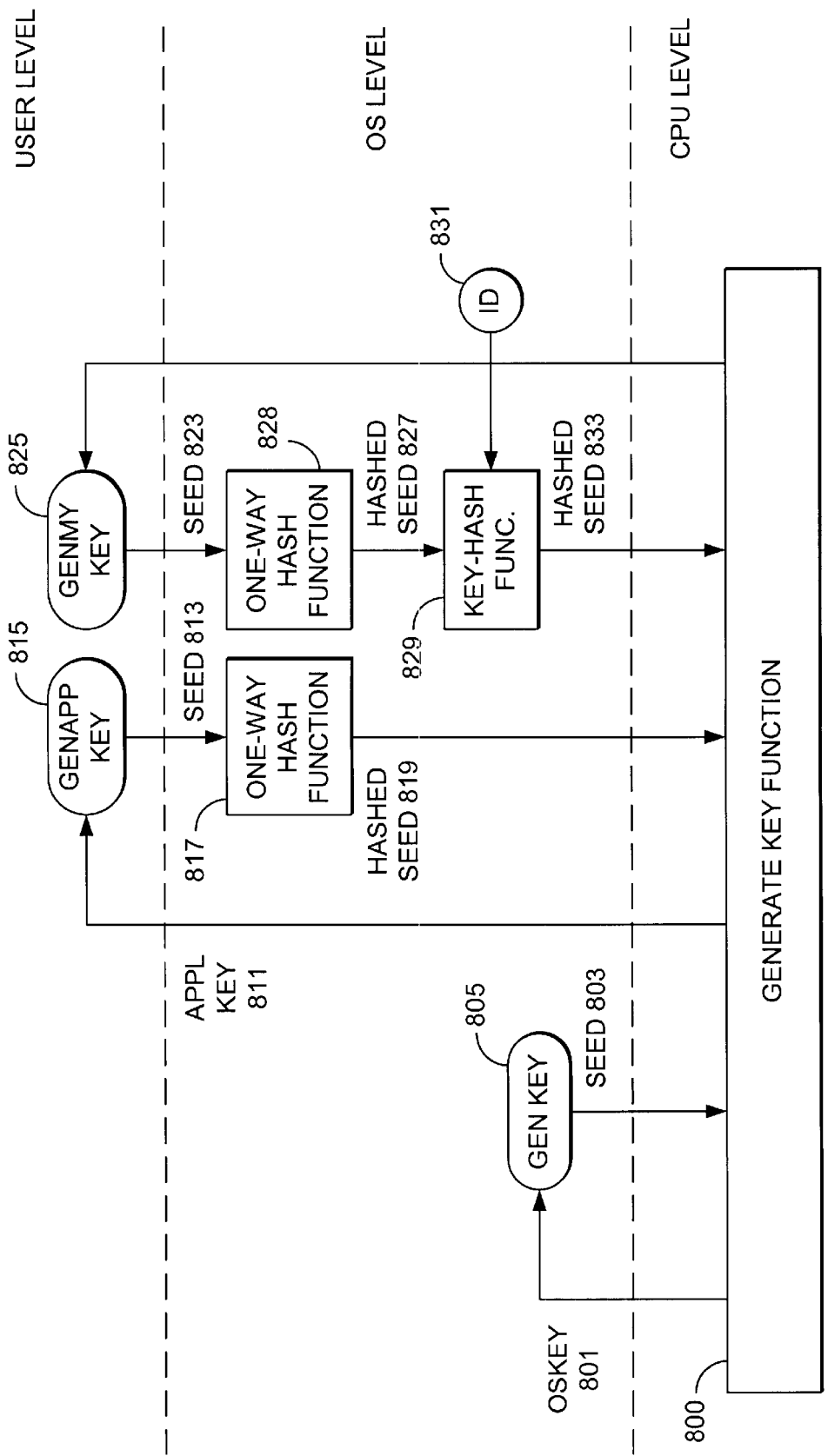
FIG. 8 is a block diagram of key generation functions according to an exemplary embodiment of the invention.

Finally, a DRMOS must protect the trusted application itself from tampering. The DRMOS must not allow other processes to attach to the process executing the trusted application. When the trusted application is loaded into memory, the DRMOS must prevent any other process from reading from, or writing to, the sections of memory allocated to the trusted application without the explicit permission or cooperation of the trusted application Key-based Secure Storage In order to protect content permanently stored on the subscriber computer, the DRMOS must provide a secure storage space. In essence, the DRMOS must securely store private keys or session keys for use with encrypted content, or provide some other mechanism for keeping these keys secret from other OSs or system level software. These keys can be used for the secure storage and retrieval of protected information. In the exemplary embodiments described in this section, the information to be stored in a protected format is encrypted using one of a set of keys that may be generated by a function 800 (FIG. 8) provided by the CPU. The storage key generation process is tightly coupled to the DRMOS so that the same key cannot be generated by the CPU for an unrelated operating system, or by any software on another computer. Three types of storage keys are envisioned as illustrated in FIG. 8: an OS storage key 801, an application storage key 811, and a user storage key 821. Each key is specific to the entity that requests it.

Beginning with the OS storage key 801, the DRMOS passes a "seed" 803 as an operand of a key-generation instruction ("GenerateKey") 805 to the CPU and receives an OS storage key based on the seed 803 and the identity of the DRMOS. The CPU will always return the same OS storage key 801 when the same seed 803 is provided by the same DRMOS but will return a different OS storage key if the same seed 803 is provided by an unrelated operating system. Because an unrelated operating system cannot get the same key 801, it cannot read any data encrypted by the DRMOS.

In an alternate embodiment, only a single operating system storage key is used by the DRMOS as described below. Therefore, in this embodiment only the identity of the DRMOS is factored into the key generation function 800 and the seed 803 is not necessary.

An application storage key 811 is generated when an application calls an operating system instruction ("GenerateApplKey") 815 using a seed 813. The DRMOS passes the seed 813 through an application-specific one-way hash function 817 to produce a hashed seed 819. The hashed seed 819 is then passed to the CPU through the GenerateKey instruction described above. The resulting application storage key 811 is returned to the application for use. Because the GenerateKey function uses the operating system's identity, the same application executing under an unrelated operating system cannot get the same key, and therefore cannot access the encrypted data, even if it requests the key using the same seed 813. Similarly, an unrelated application using the same seed 813 gets a different key because the DRMOS passes the seed 813 through a different hash algorithm for each application.

Figure 9:
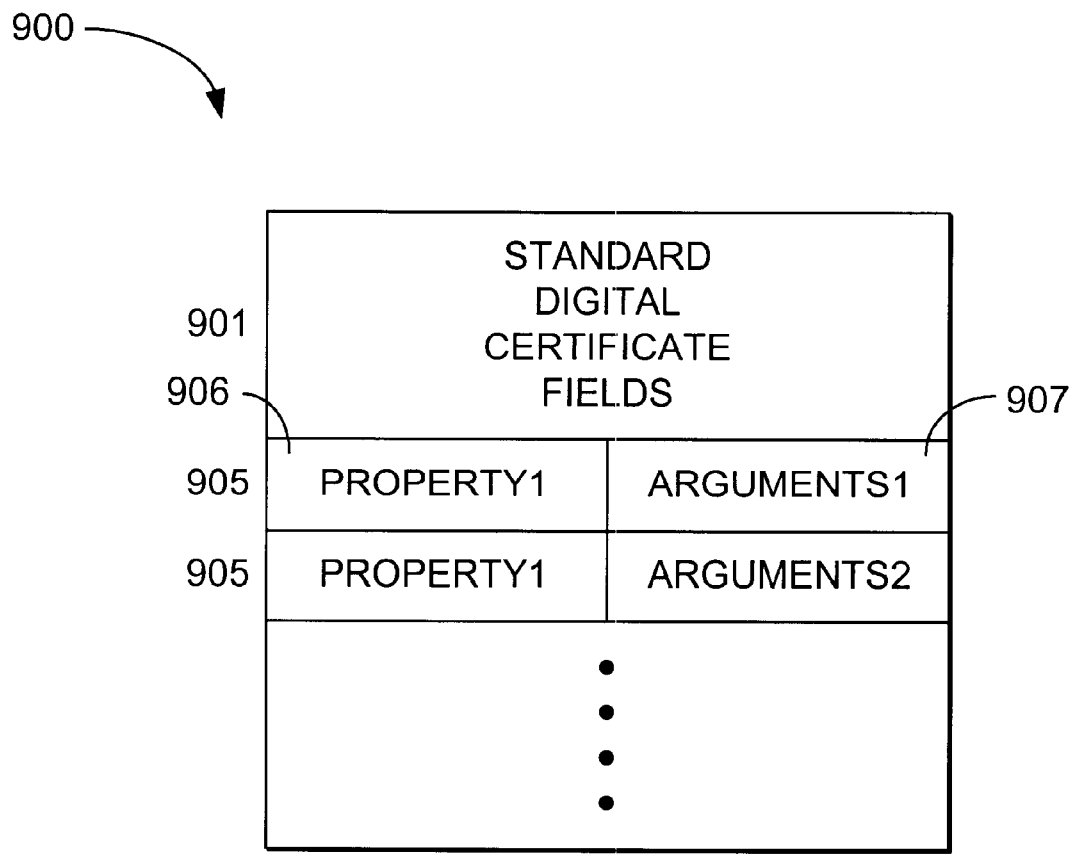
FIG. 9 is a diagram of a rights manager certificate data structure for use in an exemplary implementation of the invention.

In an alternate embodiment, the operating system stores decryption keys for applications using its own identity; the applications call the operating system to retrieve application keys. This also provides a way for an application to allow other applications access to its key and therefore to the content encrypted by the key. Instead of creating a secret using a seed 813, the application passes in the access predicate for the content. The access predicate designates values that must be present in the rights manager certificate for an application wishing access to the content. An exemplary embodiment for an access predicate is shown in FIG. 9 and described in detail in the following section. The DRMOS supplies the seed 813 that is required to generate the application specific key and passes the seed 813 through a generic one-way hash. The DRMOS encrypts the seed 813 and the access predicate using an OS storage key and associates the encrypted access predicate with the encrypted seed. When any application requests access to a key protected by an access predicate, the DDRMOS compares the criteria in the access predicate against the rights manager certificate of the requesting application. An application that meets the criteria is given access to the seed 813 and therefore to the application storage key. Because the seed 813 is encrypted using an OS storage key, an application that is running under an unrelated operating system will be unable to gain access to the encrypted data because the unrelated operating system cannot decrypt the seed 813.

Finally, a particular user can request a key that is based on a user identity assigned by the DRMOS or another facility that guarantees a unique identity for each user. The user supplies a seed 823 in a "GenerateUserKey" call 825. The operating system passes the seed 823 through a one-way hash 828, and then passes the resulting first hashed seed 827 through a keyed hash routine 829 to generate a second hashed seed 833. The operating system factors the user identity 831 into the keyed hash routine 829 so that the second hashed seed 833 is unique to the user. The second hashed seed 833 is passed to the CPU, which returns the user storage key 821. As described above, only the same user will be able to access data encrypted with the storage key 821 when the DRMOS that generated the key is executing. Analogously, the keyed hash routine 829 guarantees that the user storage key will not duplicate either an OS storage key or an application storage key based on the same seed. Such a facility is used when downloaded content can be accessed only by a particular user. Moreover, if downloaded content is to be accessed only by a particular user and by a particular application, the secret to be stored may be divided into parts, with one part protected by an application-specific key and the other part protected by a user-specific key.

Once the data is encrypted using the storage keys, there must be a way to recover the keys when the DRMOS identity changes (as when the operating system is upgraded to an incompatible version or an unrelated operating system is installed) or the computer hardware fails. In the exemplary embodiments described here, the keys are stored off-site in a "key vault" provided by a trusted third party. In one embodiment, the DRMOS contains the IP addresses of the key vault providers and the user decides which to use. In another embodiment, the content provider designates a specific key vault and the DRMOS enforces the designation. In either embodiment, when the user requests the restoration of the storage keys, the key vault provider must perform a certain amount of validation before performing the download. The validation process can include such actions as recording the identity of the original operating system (or computer) in a revocation list, checking the frequency of the requests, and requiring a credit card number before downloading the storage keys.

Rights Management

Most operating systems do not directly process media content, such as video or audio. That function is usually available through special application programs. Therefore, a content provider must not only trust the operating system but must also trust the application that will process the content. Content also can be accompanied by a predicate stating which applications are to be trusted to access that content, and this statement can include a list of generic properties that implicitly define a set of applications. Further associating a rights manager certificate with the application provides identification of the application and certification of its properties. This allows the content provider to determine if the application fulfills the requirements of the content provider before downloading content, and also allows the operating system to restrict future access to only the appropriate applications.

One exemplary embodiment of a rights manager certification is shown in FIG. 9. A list of application properties 903 is appended to the digital certificate fields 901 standard in some digital certificate format such as X.509. The certificate names the application. Each entry 905 in the list 903 defines a property 906 of the application, along with optional arguments 907. For example, one property might be that the application cannot be used to copy content. Another example of a property is one that specifies that the application can be used to copy content, but only in analog form at 480P resolution. Yet another example of a property is one that specifies that the application can be used to copy content, but only if explicitly allowed by an accompanying license. Additional examples include the right to store an encrypted copy of the content and to restrict such storage to only certain, acceptable peripheral devices. The property 906 can also be used to specify acceptable helper applications, such as third-party multimedia processing stacks or other libraries, to be used in conjunction with the application named in the certificate. The certificate is signed by an operating system vendor, content provider, or third party, certifying the properties of the application.

Because the content provider must trust the DRMOS and application to protect the content from misuse once downloaded, the content provider attaches an access predicate to the content. This access predicate can also include a license to the content. The basic functions of both the access predicate and the license, which were described in the system overview, are explained in detail next.

In one embodiment, the access predicate takes the form of a required properties access control list (ACL) as shown in FIG. 10. The required properties ACL 1000 contains a basic trust level field 1001, which specifies the minimum rights management functions that must be provided by any application wishing to process the content. These minimum functions can be established by a trade association, such as the MPAA (Motion Picture Association of America), or by the DRMOS vendor. A unique identifier is used to reference a list of the minimum functions. The minimum functions list can include CPU, DRMOS, and application specific requirements.

The required properties ACL 1000 can also contain one or more extended trust level fields 1003. The extended trust level fields 1003 contains identifiers that specify additional rights management function that must be provided by the subscriber computer. For example, a required properties ACL can require that only a certain version of a particular application be allowed access to the content. The required properties ACL 1000 is compared against the certificates for the CPU, the DRMOS, and the application starting at the hardware level, i.e., CPU, DRMOS, application name, version, and specific properties for the application. One of skill in the art will readily recognize that the required properties ACL 1000 can require that all properties must be present, or at least one of the properties, or some specified subset.

The content license (FIG. 11) imposes additional restrictions on what kind of processing can be performed on the content once an application has access to the content. As described briefly above, the license data structure 1100 can limit the number of times the content can be accessed (usage counter 1101), determine what use can be made of the content (derivation rights 1103), such as extracting still shots from a video, or building an endless loop recording from an audio file, or a time-based expiration counter 1105.

The license can also specify whether or not a trusted application is permitted to validate other client computers and share the content with them (sublicense rights 1107), in effect having the subscriber computer act as a secondary content provider. The sublicense rights 1107 can impose more restrictive rights on re-distributed content than those specified in a license for content downloaded directly from the original content provider. For example, the license 1100 on a song purchased directly from the music publisher can permit a song to be freely re-played while the sublicense rights 1107 require a limit on the number of times the same song can be re-played when redistributed. To enforce the sublicense rights 1107, in one embodiment, the trusted application modifies the original license 1100 to specify the additional restrictions and downloads the modified license with the re-distributed content. In an alternate embodiment, the original content provider downloads a sublicense along with the content and that sublicense is re-distributed by the trusted application when it re-distributes the content. The sublicense is structurally identical to the license data structure 1100 although the content of the fields differs.

Additional licensing restrictions will be readily apparent to one skilled in the art and are contemplated as within the scope of the invention.

The license 1100 is stored with the content on secured storage. In one embodiment, the required properties ACL 1000 is also stored with the license 1100 and the content. In an alternate embodiment, the ACL 1000 is secured separately and controls access to the storage key for the content as described above.

In the embodiments described above, the DRMOS is responsible for checking the required properties ACL and for enforcing the licensing restrictions. By providing the validation functions in the DRMOS, the functions are centralized and can be utilized by any process. In an alternate embodiment, the validation functions concerning the application are coded directly into the trusted applications programs. A similar effect is achieved in yet another alternate embodiment that places the application validation functions in a library that is incorporated into the trusted applications.

One of skill in the art will immediately perceive that certain rights are more easily enforced at the DRMOS level, such as the right for a certain application to access a key or other content, or the ability to open a file a limited number of times, while other types of rights are best enforced by the application itself. Since the DRMOS enforces the restriction that only explicitly stated applications can access restricted content, the application can be trusted to enforce the additional restrictions. Alternate embodiments in which the enforcement of certain rights is allocated to the DRMOS and the enforcement of others to the application is therefore contemplated as within the scope of the invention.

As described above in conjunction with FIG. 2, the content provider 220 delivers content to the subscriber computer 200 after trust is established by transmitting the appropriate certificates/identities for the CPU, the DRMOS, and the application to the provider. The content can be explicitly encrypted by the content provider for this combination of CPU, DRMOS, and application, as described above, or, if the content is sent over a secured link (with, for example, Secure Socket Layer services), the content provider can encrypt the content using the session key for the secure link. In the latter embodiment, the DRMOS writes the encrypted content to permanent storage and uses one of the storage keys generated by the CPU to securely store the session key for later use. Alternately, the content provider can choose not to encrypt the content if it is transmitted to the application in a secure fashion, in which case the application performs the encryption if it stores a persistent copy of the content.

The particular methods performed by a subscriber computer of an exemplary embodiment of the invention have been described. The methods performed by the subscriber computer have been shown by reference to flowcharts, operational diagrams, and data structures. Methods performed by the content provider have also been described.

Conclusion

A digital rights management system has been described whereby certain cryptographic secrets are reliably associated with a particular digital rights management operating system or family of operating systems running on a particular general-purpose computer. The operating system uses these secrets to authenticate itself to a third party, to receive encrypted content or information, to store this content or information securely, and to retrieve it later. No unrelated operating system or other software running on the same computer can obtain these secrets and perform these actions, nor can any operating system or other software running on any other computer. By using these cryptographic secrets, the digital rights management operating system can recursively provide derived cryptographic secrets for the same uses by applications running on the same operating system on the same computer.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention.

For example, those of ordinary skill in the art will appreciate that various combination of the exemplary embodiments are applicable to solve the digital rights management problem depending on the exact computing environment. Furthermore, those of ordinary skill in the art will recognize that the invention can be practiced on a large scale although illustrated herein with only a single subscriber and content provider.

The terminology used in this application with respect to is meant to include all hardware and software configuration and all networked environments. Therefore, it is manifestly intended that this invention be limited only by the following claims and equivalents thereof.

We claim:

1. A computerized method for a digital rights management operating system comprising:
    assuming a trusted identity;
    executing a trusted application;
    loading rights-managed data into memory for access by the trusted application; and
    protecting the rights-managed data from access by an untrusted program while the trusted application is executing.

2. The computerized method of claim 1, wherein protecting the rights-managed data comprises:
    refusing to load the untrusted program into memory.

3. The computerized method of claim 1, wherein protecting the rights-managed data comprises:
    removing the rights-managed data from memory before loading the untrusted program.

4. The computerized method of claim 3, further comprising:
    terminating the execution of the trusted program.

5. The computerized method of claim 3, further comprising:
    renouncing the trusted identity before loading the untrusted program when the untrusted program executes at the operating system level.

6. The computerized method of claim 1, wherein protecting the rights-managed data comprises:
    securing the rights-managed data written to a page file by the digital rights management operating system.

7. The computerized method of claim 6, wherein securing the rights-managed data written to a page file comprises:
    prohibiting raw access to the page file while the trusted application is executing.

8. The computerized method of claim 6, wherein securing the rights-managed data written to a page file comprises:
    erasing the page file before allowing raw access to the page file.

9. The computerized method of claim 8, further comprising:
    terminating the execution of the trusted application.

10. The computerized method of claim 6, wherein securing the rights-managed data written to a page file comprises:
    encrypting the rights-managed data prior to writing it to the page file.

11. The computerized method of claim 1, further comprising:
    protecting the trusted application from modification by an untrusted process while the trusted application is executing.

12. The computerized method of claim 11, wherein protecting the trusted application comprises:
    refusing to attach the untrusted process to the trusted application.

13. The computerized method of claim 11, wherein protecting the trusted application comprises:
    preventing the untrusted process from accessing memory allocated to the trusted application.

14. The computerized method of claim 1, further comprising:
    restricting a user to a subset of available functions for manipulating the rights-managed data.

15. The computerized method of claim 1, further comprising:
    restricting a user to a subset of functions available for modifying the trusted application during execution.

16. The computerized method of claim 1 wherein the elements are performed in the order recited.

17. A computer system comprising:
    a processing unit;
    a system memory coupled to the processing unit through a system bus;
    a computer-readable medium coupled to the processing unit through a system bus; and
    a digital rights management operating system executed from the computer-readable medium by the processing unit, wherein the digital rights management operating system causes the processor to create a trusted identity for the digital rights management operating system.

18. The computer system of claim 17, further comprising:
    a trusted application executed from the computer-readable medium by the processing unit, wherein the trusted application causes the processor to load rights-managed data into the system memory, and
    wherein the digital rights management operating system further causes the processor to protect the rights-managed data while the trusted application is executing.

19. The computer system of claim 18, wherein the digital rights management operating system further causes the processor to write the rights-managed data into a page file on the computer-readable medium and causes the processor to secure the rights-managed data on the page file from access by an untrusted program.

20. The computer system of claim 19, wherein the digital rights management operating system further causes the processor to erase the rights-managed data from the page file before allowing access to the page file by the untrusted program.

21. The computer system of claim 18, wherein digital rights management operating system further causes the processor to revoke the trusted identity and terminate the trusted application prior to loading an untrusted program.

22. A computer-readable medium having computer-executable instructions for a digital rights management operating system stored thereon comprising:

obtaining, from a computer processor, a first value for a monotonic counter;

presenting, to a trusted time server, the first value for the monotonic counter;

receiving, from the trusted time server, a certificate binding the first value of the monotonic counter to a time on the trusted time server;

obtaining, from the processor, a second value for the monotonic counter before loading a trusted component;

calculating, using the certificate and the second value, a trusted current time;

comparing a time stamp on a trusted component with the trusted current time; and determining whether to load the trusted component based on the comparison.

23. The computer-readable medium of claim 22, wherein obtaining and presenting the first value of the monotonic counter occurs on a pre-determined schedule.

24. The computer-readable medium of claim 22, wherein the time stamp comprises a date and time at which the trusted component becomes invalid and the trusted component is loaded when the trusted current time is less than the time stamp.

* * * * *

UNITED STATES PATENT AND TRADEMARK OFFICE
CERTIFICATE OF CORRECTION

PATENT NO.     : 6,330,670 B1
DATED           : December 11, 2001
INVENTOR(S)  : England et al.

It is certified that error appears in the above-identified patent and that said Letters Patent is hereby corrected as shown below:

Title page,
Item [56], References Cited, OTHER PUBLICATIONS add the following,
-- Arbaugh et al., "A Secure and Reliable Bootstrap Architecture", Distributed Systems Laboratory, Philadelphia, PA 1997, pp.65-71 --
-- Lampson et al., "Authentication in Distributed Systems: Theory and Practice", Digital Equipment Corporation, ACM Transactions on Computer Systems, Vol. 10, No. 4, November 1992, pp. 265-310 --
-- Clark et al., "Bits: A Smartcard Protected Operating System", Communications of the ACM, Vol. 37, No. 11, November 1994, pp. 66-70, 94 --
-- Yee, "Using Secure Coprocessors", School of Computer Science, Carnegie Mellon University, 1994, 104 pages --
-- Abadi et al., "Authentication and Delegation with Smart-cards", July 30, 1992, 30 pages --
-- Murphy et al., "Preventing Piracy: Authorization Software May Ease Hollywood's Fear of the Net", Internet World Magazine, April 1, 2000, 3 pages. --
-- "Internet Security: SanDisk Products and New Microsoft Technology Provide Copy Protected Music for Internet Music Player Market. (Product Announcement)", Edge: Work Group Computing Report, April 19, 1999, 2 pages. --

Column 2,
Line 9, start new paragraph with -- "Digital rights… --.

Column 7,
Line 2, replace "arc" with -- are --.

Column 9,
Line 37, replace "arc" with -- are --.

Column 10,
Line 33, replace "arc" with -- are --.

Column 12,
Line 36, replace "functions" with -- function --.

UNITED STATES PATENT AND TRADEMARK OFFICE
CERTIFICATE OF CORRECTION

PATENT NO.   : 6,330,670 B1
DATED        : December 11, 2001
INVENTOR(S)  : England et al.

It is certified that error appears in the above-identified patent and that said Letters Patent is hereby corrected as shown below:

Column 14,
Line 18, replace "$(K_{n,Kn}^{-1})$" with -- $(K_n, K_n^{-1})$ --.

Column 17,
Line 53, replace "DDRMOS" with -- DRMOS --.

Signed and Sealed this

Eleventh Day of February, 2003

JAMES E. ROGAN
*Director of the United States Patent and Trademark Office*